Figure 1:
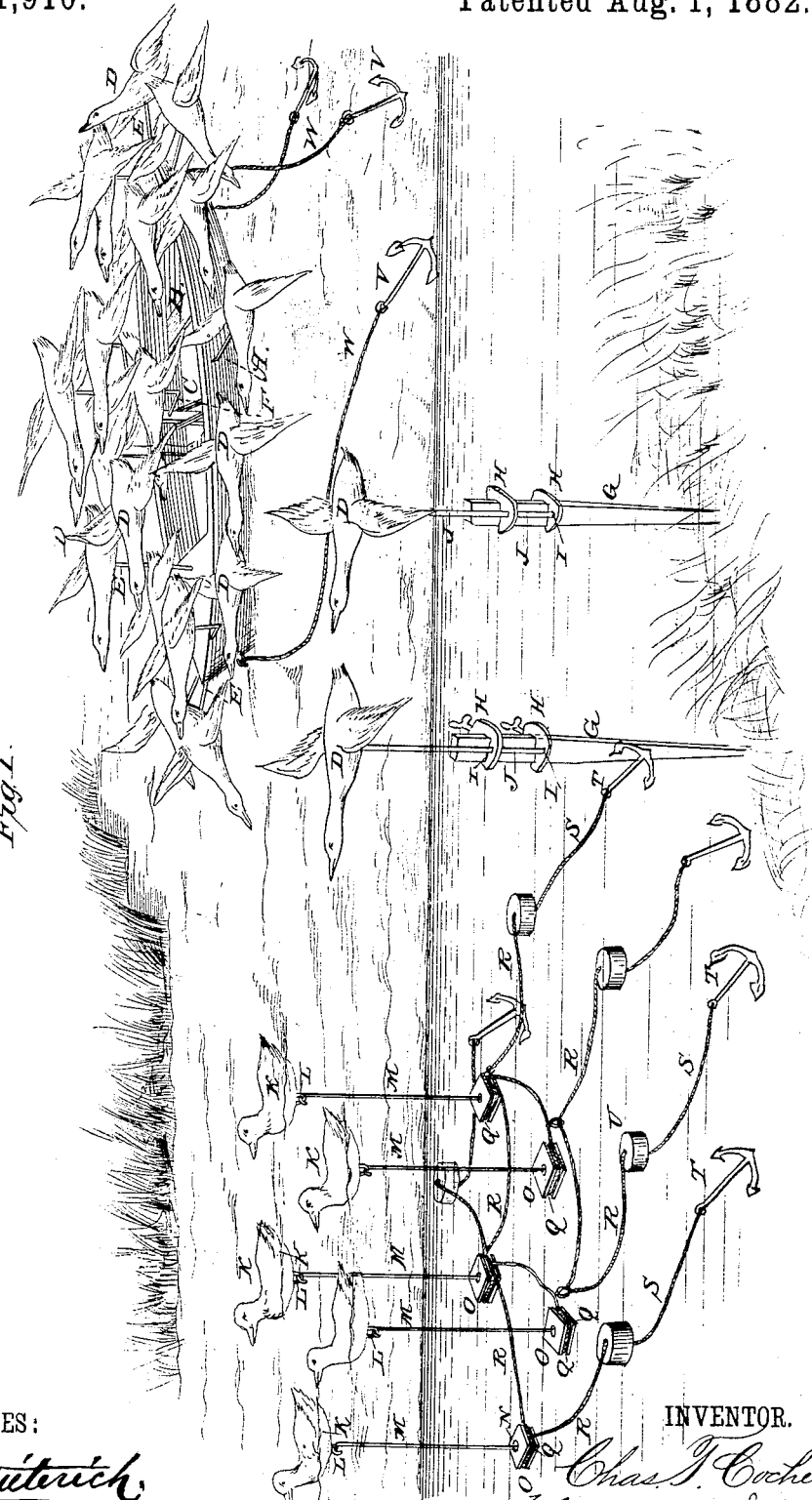

(No Model.) 2 Sheets—Sheet 1.

C. T. COCHEL.
DECOY.

No. 261,910. Patented Aug. 1, 1882.

WITNESSES:
Fred. G. Dieterich
Charles H. Baker

INVENTOR.
Chas. T. Cochel,
by C. A. Snow & Co.
ATTORNEYS.

(No Model.) 2 Sheets—Sheet 2.
C. T. COCHEL.
DECOY.
No. 261,910. Patented Aug. 1, 1882.
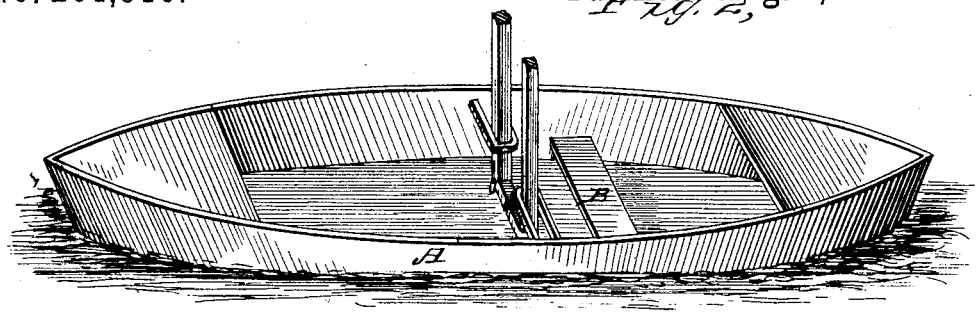
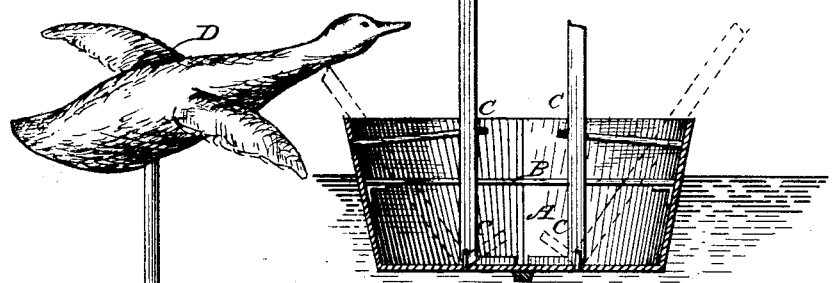
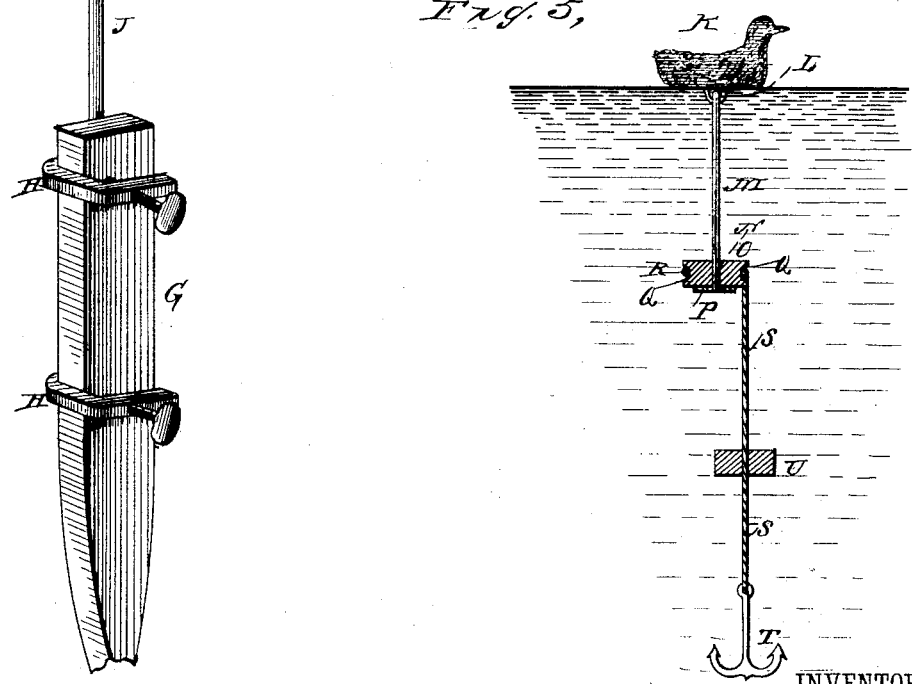
WITNESSES:
INVENTOR.

UNITED STATES PATENT OFFICE.

CHARLES T. COCHEL, OF UNIONTOWN, MARYLAND.

DECOY.

SPECIFICATION forming part of Letters Patent No. 261,910, dated August 1, 1882.

Application filed May 29, 1882. (No model.)

*To all whom it may concern:*

Be it known that I, CHARLES T. COCHEL, of Uniontown, in the county of Carroll and State of Maryland, have invented certain new and useful Improvements in Decoys; and I do hereby declare that the following is a full, clear, and exact description of the invention, which will enable others skilled in the art to which it appertains to make and use the same, reference being had to the accompanying drawings, which form a part of this specification.

Figure 1 is a perspective view, illustrating my invention complete in position for operation. Fig. 2 is a detail view of the boat or float stripped of the flying decoys. Fig. 3 is a transverse vertical sectional view of the same. Fig. 4 is a detail view of the staff-decoy, and Fig. 5 is a vertical sectional view of one of the floating decoys.

Corresponding parts in the several figures are denoted by like letters of reference.

This invention relates to decoys such as are used by sportsmen for attracting flocks of wild fowl within range of their guns; and it consists in the improved construction and arrangement of said decoys, which will be hereinafter fully described, and particularly pointed out in the claims.

My invention consists of two parts—viz., a flock of decoys apparently on the wing, and another flock apparently afloat, toward which the flying decoys are supposed to steer their course.

In the drawings hereto annexed, A represents a boat or float suitably constructed, and having a seat, B, for the sportsman. In the bottom of said boat, just in front of the seat, are pivoted a pair of bell-crank levers, C C, the lower short arms of which form treadles, by which they may be conveniently manipulated.

D D are decoys representing wild fowls—such as ducks or geese—in the act of flying or with their wings stretched out. Said decoys are mounted upon wire rods E, by which they are attached in any suitable manner to the sides and ends of the boat, their arrangement in relation to each other being such as to simulate a flock of ducks having just risen out of the water for the purpose of flying a short distance. The sides and ends of the boat may be provided with openings or recesses, into which the rods E may be simply inserted, as shown, or staples may be provided to receive the ends of said rods or holders.

The upper long arms of the bell-crank levers C are provided with rods or arms F, upon which additional decoy-birds D may be mounted.

G G represent staffs or stakes, of which any desired number may be used, which are driven below the water-line and provided with clamps H H, having openings I to receive a vertical rod or wire, J, upon the upper end of which is mounted a flying decoy, D, of the construction already described. These staff-decoys are all placed in a position heading from the flying flock toward the floating decoys, which I shall now describe.

To the under side of each floating decoy, (which is represented by letter K,) is secured a staple, L, to which is attached a wire, M, which may work freely in all directions. Wire M extends through an opening, N, in a weight or sink, O, and is provided at its lower end with a button, P, to retain it in its proper position. The weights O are provided with annular grooves Q to receive lines R, by which the said weights are connected, thus connecting the whole set of decoys, of which a large number are frequently used, securely together. Ropes S, having anchors T, are also attached at suitable points, for the purpose of anchoring the decoys in position, and for the purpose of preventing them from being tangled or lost. Said anchor-ropes are provided with buoys or floats U, which must, however, be kept under water.

The boat A has anchors V attached to it by lines W for the purpose of anchoring it in any desired position.

In operation, after locating and anchoring the floating decoys, which, being connected, as described, may be readily paid out from a boat in a few minutes time, instead of being successively handled, as is usually the case, the staff-decoys are planted and arranged heading toward the floating decoys, as shown. Finally, the boat A, with its flying decoys, is anchored and the gunner takes his seat. By pressing down the lower arms or treadles of the bell-crank levers C he may now throw the decoys mounted upon the arms F together over the middle of the boat, when the bodies and outstretched wings of said decoys will completely conceal him from view. The wild fowls, seeing from the distance the flock on the wing and the staff-decoys apparently darting from said flock toward the floating decoys, will be attracted. When they are within range the sportsman may release his hold or pressure upon the treadles, thus causing the bell-crank levers to drop back, uncovering him, when he may discharge his gun, and immediately, if he so wishes, cover himself again out of sight by merely pressing the treadles.

The advantages of my invention will be readily understood by every skilled sportsman. The complete outfit is convenient, inexpensive, and easily manipulated. In calm weather the gunner may move and rock his boat at will, thus moving the entire flock. He is also able to change the position of the boat from time to time, as desired, and he is not compelled to occupy any uncomfortable posture, as must be done frequently for a long period in order to insure success in duck-shooting as commonly pursued.

Having thus described my invention, I claim and desire to secure by Letters Patent of the United States—

1. A decoy set or outfit consisting of a flock of floating, a flock of flying, and one or more staff, decoys, all constructed and arranged substantially as set forth.

2. The combination, with a boat, of decoys representing flying birds mounted upon arms or levers operated by treadles, so that the said decoys may be swung together over the boat, thus covering its occupant out of sight, as set forth.

3. The boat A, having bell-crank levers C, provided with arms F, in combination with decoys representing flying birds attached to said arms F, substantially as and for the purpose set forth.

4. The combination, with a flock of flying decoys attached to a boat, substantially as described, of one or more staff-decoys representing single birds in advance of said flock, as set forth.

5. The flock or set of floating decoys, having swiveled or loosely-connected wires carrying weights moving freely upon said wires, and provided with annular grooves to receive the connecting-lines, in combination with the anchor-ropes having buoys or floats, substantially as set forth.

In testimony that I claim the foregoing as my own I have hereto affixed my signature in presence of two witnesses.

CHARLES T. COCHEL.

Witnesses:
 WM. BAGGER,
 C. K. ALLEN.